United States Patent [19]

Geisler et al.

[11] Patent Number: 4,824,162
[45] Date of Patent: Apr. 25, 1989

[54] COVER FOR PICKUP TRUCK BED

[76] Inventors: Richard J. Geisler, 15721 S. Washington, Oregon City, Oreg. 97045; Gary M. Scott, 17385 Colina Vista Ave., Milwaukie, Oreg. 97267; Thomas M. Telford, 7485 Carson Cir., Gladstone, Oreg. 97027

[21] Appl. No.: 85,397

[22] Filed: Aug. 13, 1987

[51] Int. Cl.[4] .............................................. B60P 7/02
[52] U.S. Cl. ...................................... 296/100; 16/269
[58] Field of Search ................ 296/100, 146; 292/7, 292/137, 145; 16/269, 355

[56] References Cited

U.S. PATENT DOCUMENTS

| 4,221,423 | 9/1980 | Stone | 296/100 |
| 4,313,636 | 2/1982 | Deeds | 296/100 |
| 4,418,954 | 12/1983 | Buckley | 396/100 |
| 4,615,557 | 10/1986 | Robinson | 296/100 |

FOREIGN PATENT DOCUMENTS 562949 6/1975 Switzerland .

Primary Examiner—Robert R. Song
Attorney, Agent, or Firm—Robert L. Harrington

[57] ABSTRACT

A cover for a pickup truck bed including the features: An anchor strip is applied to the front wall and a front cover panel is hingedly connected thereto. Center and rear panels are hingedly connected together and a lock mechanism on each panel locks the panels in the desired covered position while allowing the individual panels to be unlocked and pivotally opened about the respective hinge connections. The hinge connections permit relative sliding along the hinge axis for dismounting of the cover panels. The panels are sealed to the truck bed walls and the hinge connections are formed by a nesting arrangement that seals and channels water over the truck sides. The rear panel seals against the tailgate and locks the tailgate against opening. The panels are sized to be readily handled by one person and are standardized to fit a variety of truck bed sizes. The anchor strip is lengthened to accommodate different lengths and because the panels fit over the side walls, different widths are accommodated by the panels reaching to different positions on the broad top edge of the side walls. The hinge connections are captured by a resilient brace that allows the panels to break away if excessive force is applied.

21 Claims, 4 Drawing Sheets

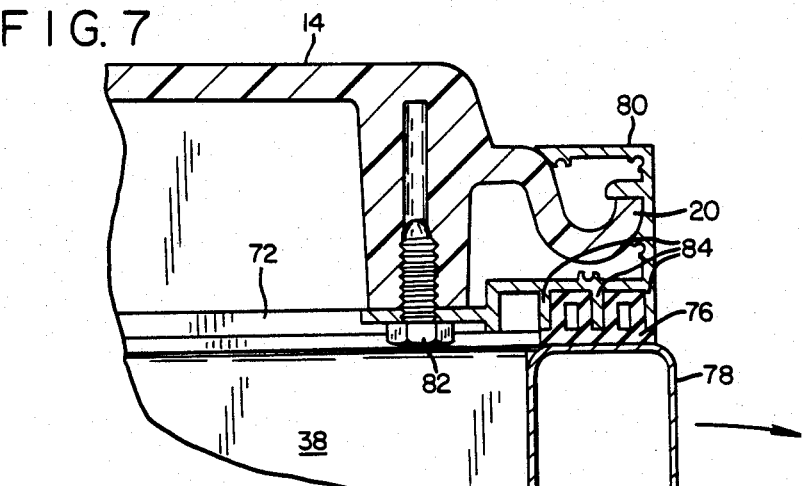
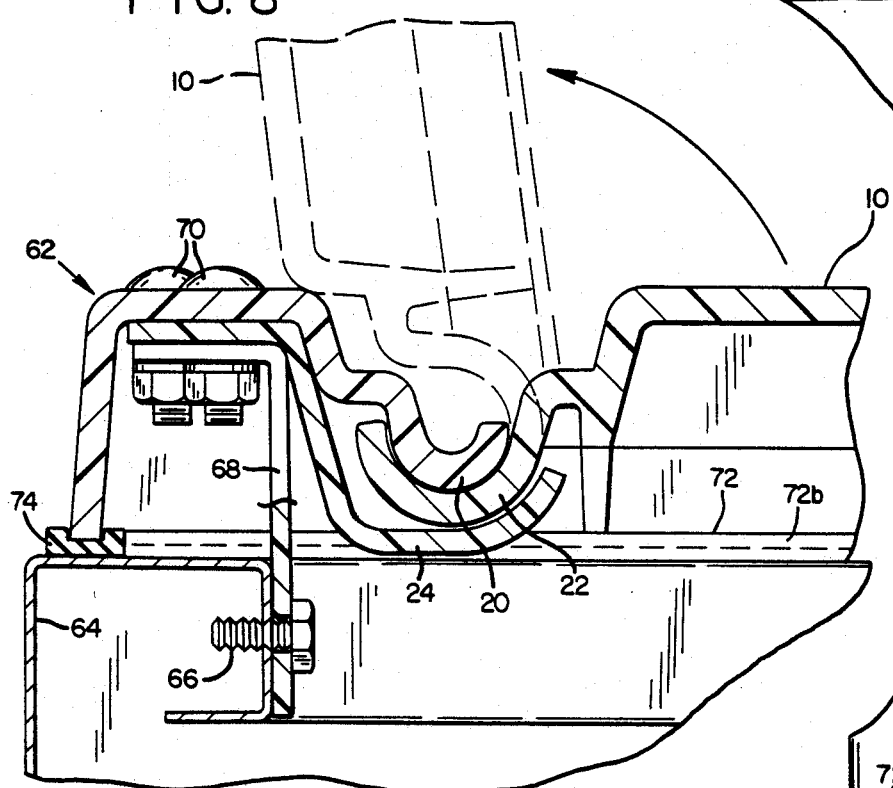
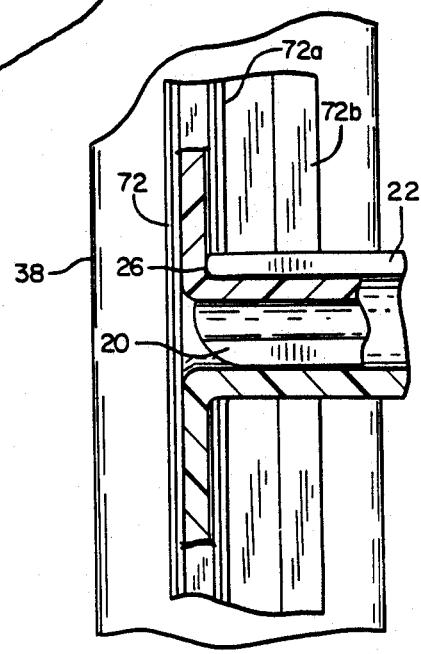
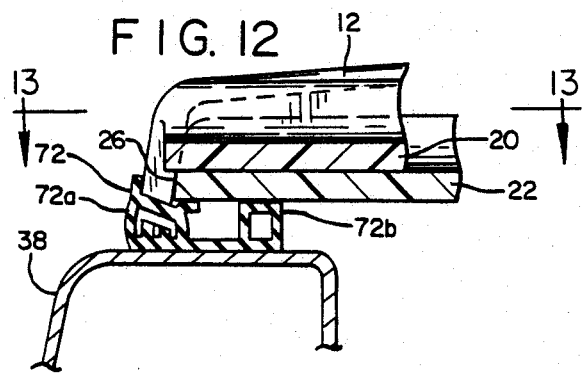

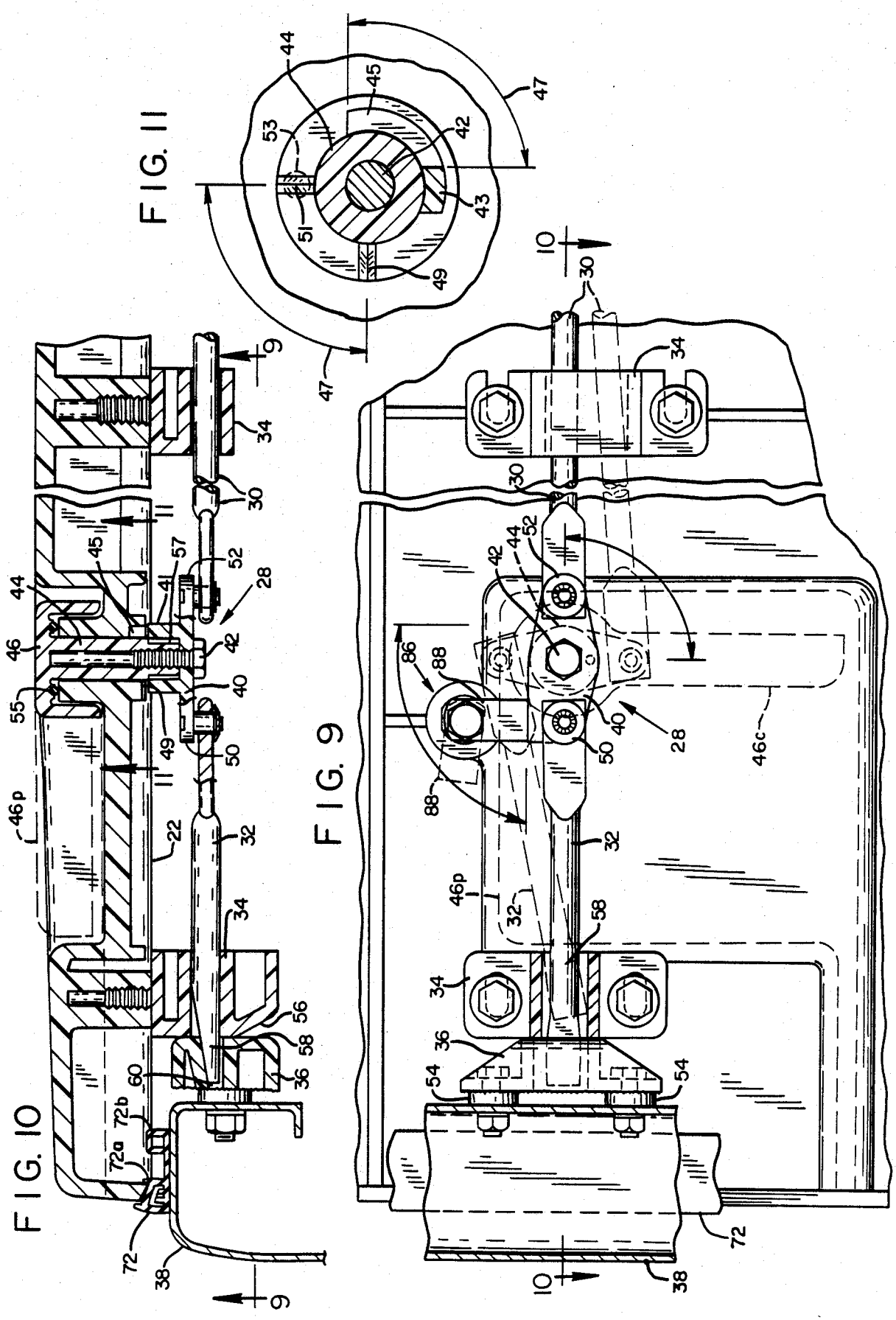

COVER FOR PICKUP TRUCK BED

FIELD OF INVENTION

This invention relates to a cover for a pickup truck bed and more particularly to a multiple of cover panels each of which pivotally opens to provide accessibility to the bed interior.

BACKGROUND OF THE INVENTION

The truck bed of a pickup truck can be used for hauling and storing innumerable objects. However, because the pickup bed is typically open topped, anything contained in the pickup bed is exposed to the weather elements and to theft and vandalism.

A top can be provided for the bed, but simply providing a stationary top for the bed severely restricts its use and convenience of use. Ideally, the pickup user would like to have the bed securely covered when security and weather protection is a concern and open topped for hauling large items or for the convenience when hauling items that are simply loaded, hauled a short distance, and unloaded.

Many inventions have been developed in an attempt to satisfy the various needs of a pickup user. The present invention is believed to provide improvements that substantially advances the usability of the pickup truck.

BRIEF DESCRIPTION OF THE INVENTION

The preferred embodiment of the present invention provides a cover that includes three similarly sized and configured panels that interfit in a manner that closes, seals and locks the interior while each is independently openable to expose different areas of the truck bed interior. These panels are identified by their relative position on the bed and are referred to as the front, center and rear panels.

In brief, the panels each have a forward edge and a rearward edge configured so that the forward edge of one panel interlocks with the rearward edge of an adjacent panel. The interlock as between the center and rear panels forms a hinge connection about which said center and rear panels pivot (but not at the same time). The front panel interlocks to an anchor strip along the front wall of the bed and similarly pivots open against the cab. The front and center panels, when closed, have overlapping edges that seal the interior but the overlapping edges do not function as a hinge. Each panel has a lock mechanism to lock the panels to the truck bed. A gasket around the edge of the cover seals the cover panels to the walls of the truck bed. The back edge of the rear panel seals against the tailgate and prevents opening. All of the panels, when in an opened position, can be slid free along the hinge axis for removal of the cover so as to allow conventional use of the pickup bed.

All of the above features and their advantages and including others, will become apparent by reference to the detailed description which follows and the drawings referred to therein.

DISCUSSION OF PRIOR ART

The patents that have been previously issued on truck bed covers are numerous. The patent believed most pertinent to this invention is Deeds U.S. Pat. No. 4,313,636. FIG. 9 of the Deeds patent illustrates a truck bed cover comprised of panels. A center panel is fixedly attached to the truck bed and front and rear panels are hingedly connected to this center panel.

Deeds does not provide for all three panels to open. Deeds does not provide a sliding interlock that permits separation of the panels. Deeds does not provide for removal of the three panels in a manner wherein a user, without tools, can readily convert the pickup bed to conventional use.

DESCRIPTION OF THE DRAWINGS

FIG. 7 is a section view as taken on view lines 7—7 of FIG. 1;

FIG. 8 is a section view as taken on view lines 8—8 of FIG. 1;

FIG. 9 is a section view as taken on view lines 9—9 of FIG. 10;

FIG. 10 is a section view as taken on view lines 10—10 of FIG. 9;

FIG. 11 is a section view as taken on view lines 11—11 of FIG. 10;

FIG. 12 is a partial section view as taken on view lines 12—12 of FIG. 4; and

FIG. 13 is a section view as taken on view lines 13—13 of FIG. 12.

Figure 1:
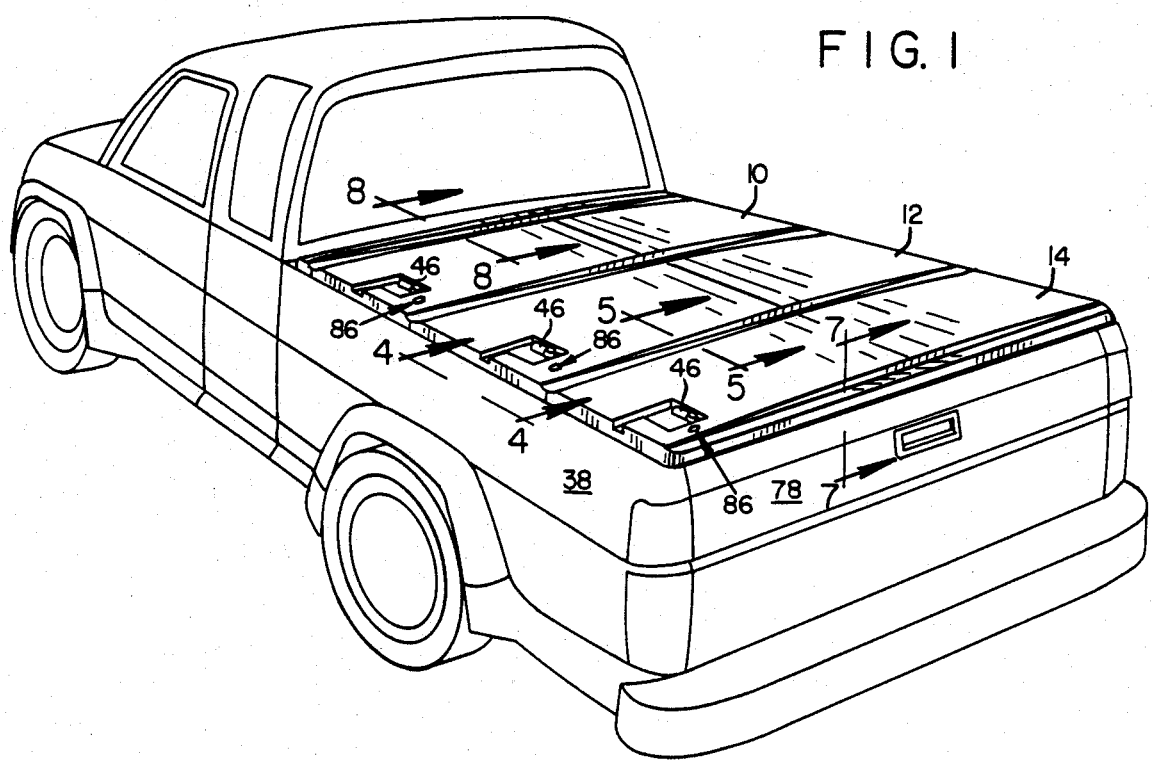
FIG. 1 is a perspective view of a pickup truck with the truck bed fitted with a cover in accordance with the present invention.

Reference is made to the drawing figures and initially to the three panels referred to as the front panel 10, center panel 12, and rear panel 14. The three panels are identified except for certain hardware that is attached to satisfy particular functions unique to the panel position. In the main, each of these panels has a designated width (width is used to correspond to the truck width) and length (front to back). The thickness is a matter of desired toughness. A high strength plastic material is contemplated and a one-inch thickness is considered adequate for most pickup cover needs.

In plastic, the panel is molded to include depending support ribs 16 and depending side edges 18 surrounding the panel on all four sides. The ribs 16 and side edges 18 provide increased strength to the plastic, with the edges 18 also providing the means for sealing the cover and for affixing the various hardware add-ons. It also provides the support base for the hinge portions at the front and rear edges which will now be explained.

Figure 5:
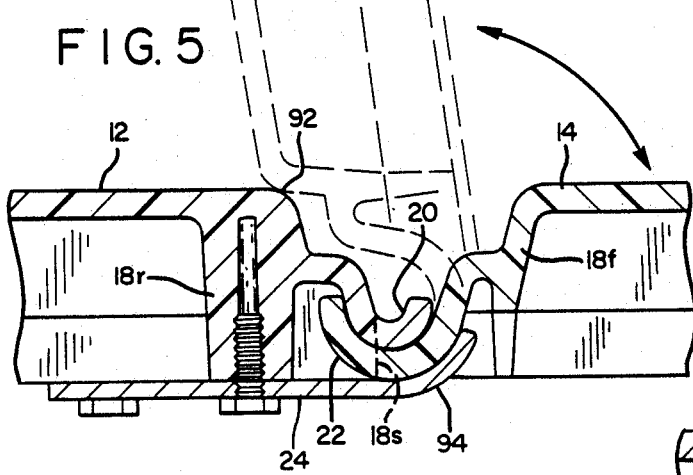
FIG. 5 is a partial section view of a hinge connection as taken on view lines 5—5 of FIG. 1.
Figure 6:
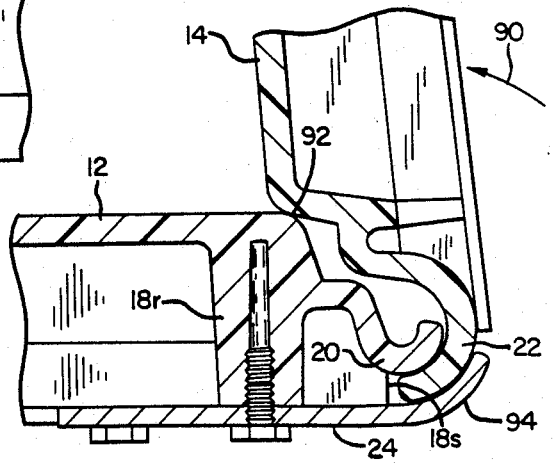
FIG. 6 is a view similar to FIG. 5 but showing the hinge connection in opened position.

Reference is made to FIGS. 5 and 6 and it will be noted from FIG. 1 that FIG. 5 is a cross-section through the interconnection of panels 12 and 14. Reference number 18r represents the rear edge of the panel 12 and reference number 18f represents the front edge of panel 14. Molded out of rear edge 18r of panel 12 is a channel-shaped rearwardly extended hinge portion 20. Molded out of front edge 18f of panel 14 is a channel-shaped forwardly extended hinge portion 22.

As illustrated in FIGS. 5 and 6, the channel shape of portion 20 has a radius that nests inside the channel shape of portion 22. Portions 20 and 22 extend substantially along the entire rear and front edges respectively of the panels 12 and 14. (See FIG. 3) Mounted only to the bottom of the panel 12 at the rear edge 18r is a rigid brace member 24 (a hardware add-on). Brace member 24, in cooperation with hinge portion 20 defines a curved cavity in which the hinge portion 22 resides with the brace member 24 supporting the hinge portion 22 of panel 14 as illustrated in FIGS. 5 and 6. (Note from FIG. 2 however that the brace member 24 need not extend the full width of the panel. It may be a single piece across the center portion of the panel or two pieces, one at each side of the panel.)

Figure 2:
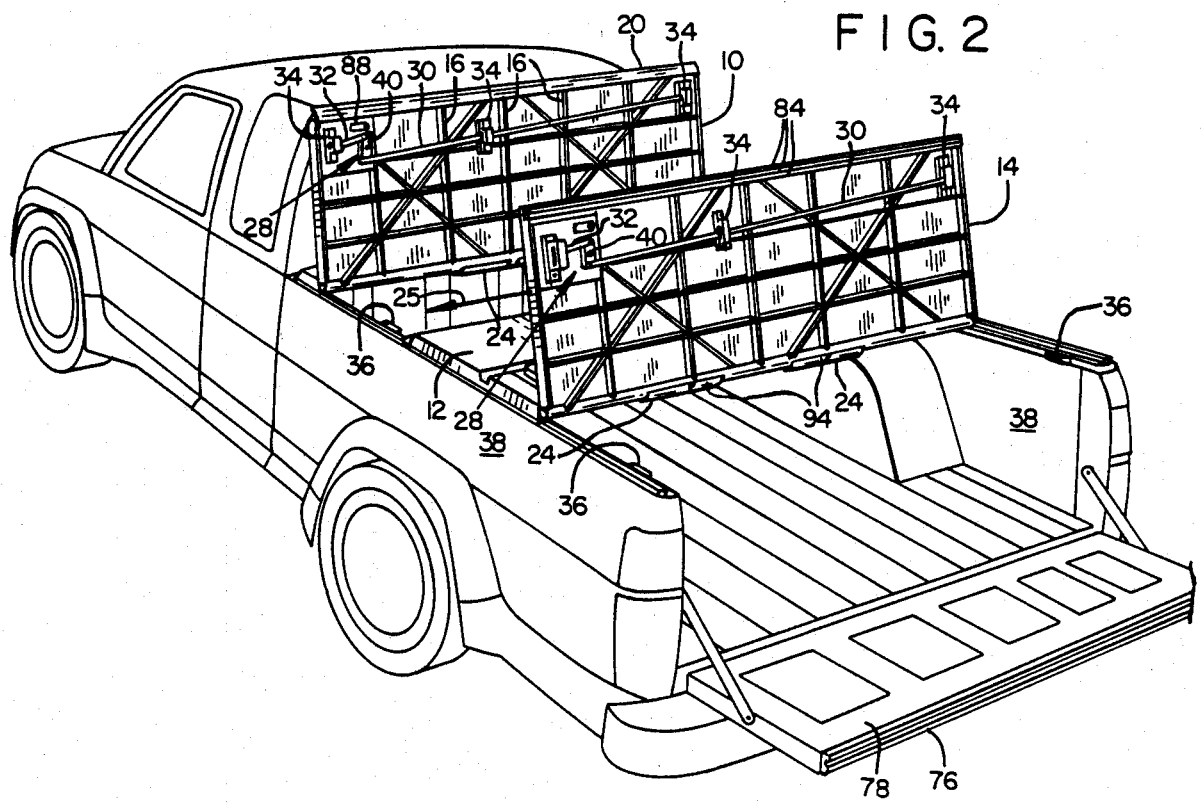
FIG. 2 is similar to FIG. 1 but showing two of the cover panels in an opened position.
Figure 3:
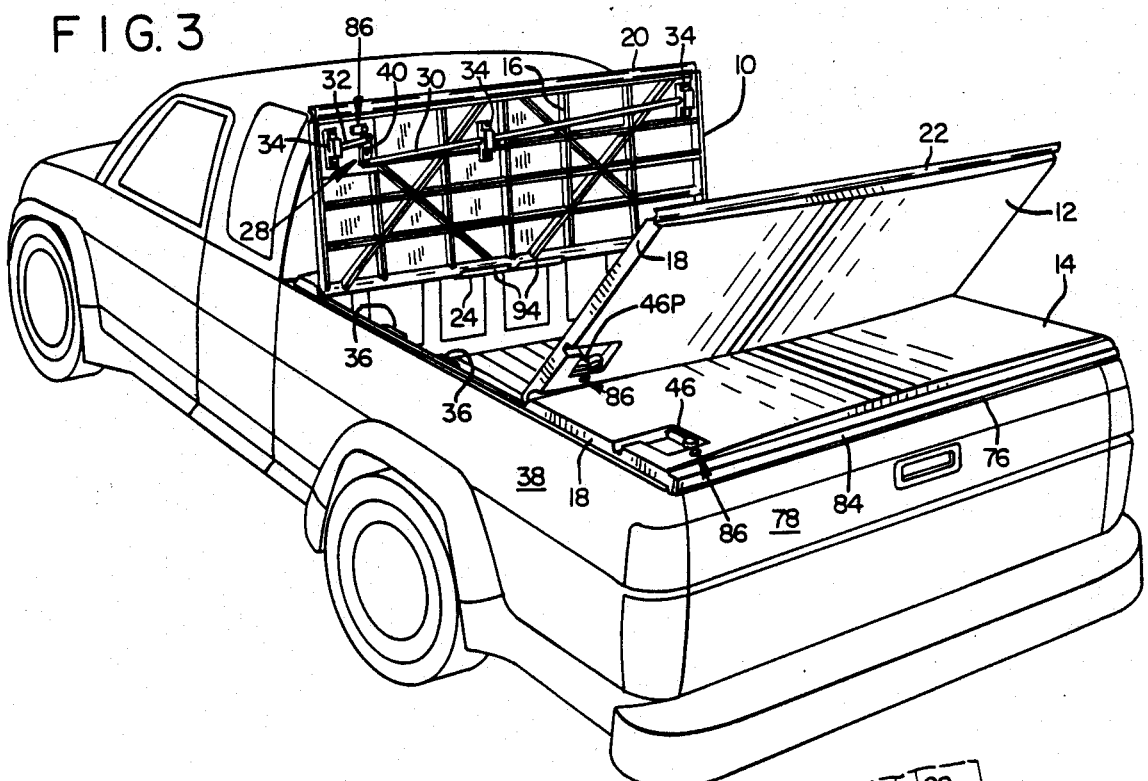
FIG. 3 is similar to FIGS. 1 and 2 but showing an alternate opened position.

The hinge portions are interlocked as illustrated in FIG. 5. From FIGS. 4 and 12 (and the dash line indication of FIG. 5) it will be noted that side edge 18s of panel 12 overlaps the hinge portion 22 of panel 14 when the panels are interlocked and laid flat as shown in solid lines of FIG. 5. However, the panels 12 and 14 are free to pivot relative to one another as illustrated in FIGS. 2 and 3 as well as in the partial views of FIG. 6 and the dash position of FIG. 5. Two functions are satisfied with such pivoting. First the truck bed under whichever of the panels is opened, is made available for loading and unloading. Second, if it is desired to remove the panel, the hinge portion 22 is pivoted to a point where it clears the end of side edge 18s (see FIG. 6) and the panel can be slid off of the truck bed as illustrated by the arrows 25 in FIG. 2.

It will be appreciated that when reassembling the panels, the two panels must be oriented as shown in FIG. 6 and slid together in substantially edge-to-edge alignment, before they can be relatively pivoted and both laid flat on the truck bed. The side edge 26 of hinge portion 22 is relieved or beveled as illustrated in FIG. 12 so as to cam the two pieces together if slightly misaligned.

Reference is now made to the lock mechanism illustrated in FIGS. 2, 3, 9, 10 and 11. As noted generally in FIGS. 2 and 3, a toggle mechanism 28 activates a pair of locking rods 30 and 32. The rods 30, 32 are slidably mounted to the underside of the panels by brackets 34. The brackets guide the rods into and out of locking lugs 36 mounted to the truck bed side walls 38 (see FIG. 2).

The toggle mechanism 28 is specifically illustrated in FIGS. 9, 10 and 11. A toggle lever 40 including flange 41 is fastened by bolt 42 to a shaft 44. The shaft 44 and flange 41 are locked against relative turning by splines 57. A handle 46 is formed integrally with the shaft 44. The handle 46 which is exposed through the top of the panel (FIGS. 1-3) is movable through a 90 degree turn between a locked position (this position being indicated by 46c in FIG. 9) and an open position (indicated by 46p in FIG. 9).

The toggle lever 40 is connected at each end 50, 52 to a flat end portion of rods 32 and 30 respectively. The short rod 32, when the rods are extended, is projected through a bracket 34 and into locking engagement with locking lug 36 fastened to the pickup bed wall as illustrated in FIGS. 9 and 10. The long rod is similarly projected through a bracket 34 and a corresponding locking lug 36 on the opposite pickup bed wall but such is not illustrated. It is desirable to have the locking lug 36 and end bracket 34 in close proximity and to achieve that, a spacer 54 or spacers (if more than one is required) are provided between the truck bed wall and lug 36 to extend the lug further into the truck bed interior and closer to the bracket 34. The bottom edge of bracket 34 has a bevel 56 as seen in FIG. 10 to guide the bracket to the side of the locking lug as the panel is closed.

It will be observed that the projected end 58 of the locking rods 30 and 32 is flattened and beveled. The slot 60 through the locking lug 36 is also beveled so that as the rod is inserted, the beveled surfaces engage and force a drawing down of the panel. This action assures a tight fit to prevent rattles.

The open position of the toggle mechanism and locking rods is illustrated in dash lines in FIG. 9. The toggle lever 40 is rotated 90 degrees (by turning of handle 46 to position 46p). This action draws the locking rods 30, 32 out of locking lugs 36 as illustrated.

The turning limitation of the toggle lever is controlled by a projection 43 (FIG. 11) that extends upwardly from flange 41 and into a slot 45 formed in the panel. Note from FIG. 11 that projection 43 can pivot from the position shown to its open position 90 degrees counter clockwise as indicated by arrow 47. Also formed in the panel are V-grooves 49, 51. A detent projection (shown in shadow lines as a ball-shaped projection 53 but which may have various configurations) is projected from the flange 41 and engages the grooves 49, 51 at each of the extreme positions of projection 43 (the movement of the detent is indicated by arrow 47). Note that the detent 53 engages groove 51 in the locked position and will engage groove 49 in the open position. With the detent in either groove, inadvertent turning of the toggle lever 40 (and shaft 44 and integral handle 46) is resisted. This resistance is determined by compression of O-ring seal 55.

It is to be noted that should a force be applied to the handle 46 to break the handle and/or its shaft 44 (e.g. in a theft attempt), the interlocking of the toggle lever will be retained in that the brackets 34 support the rods and they in turn support the toggle lever. As will be subsequently explained, key locking of the locking mechanism occurs by reason of locking lug 88 engaging and holding the toggle lever in its locked position. Breaking of handle 46 thus does not cause disassembly and the key-locked position is maintained.

Reference is now made to FIGS. 1 and 8 illustrating the anchor strip 62 and the pivotal connection for panel 10. The anchor strip 62 is configured to resemble the rear end of a panel. Thus a hinge portion 20 and a brace member 24 are provided on the anchor strip to cradle the hinge portion 22 of panel 10. As noted in FIGS. 2 and 3, the panel pivots about the anchor strip similar to the pivoting of panel 14 about the rear end of panel 12, and is removable in the same way. Anchor strip 62 is securely fastened to the truck bed front wall 64 by bolts 66. As illustrated, the three components of the anchor strip 62; i.e. the brace member 68, the brace member 24 and hinge portion 20, are separate pieces bolted together by bolts 70.

Reference is now made to FIGS. 3, 10, 7 and 8. FIG. 3 illustrates in general a weather strip 72 that is adhered to the top edge of the side walls 38. A cross-section of this weather strip is shown in FIGS. 10 and 12. A weather strip 74 is anchored to the top edge of the front wall of the truck (see FIG. 8) and a third weather strip 76 is adhered to the top edge of the tailgate 78 (FIG. 7).

Referring first to FIG. 7, the panel 14 being similar to panels 10 and 12 also has a hinge portion 20. The hinge portion 20 has no function for panel 14, however. Thus an overcover 80 is attached over the hinge portion 20 with bolt 82. This overcover has two functions. The first function is to finish off the back end of the cover for cosmetic purposes. The second is to provide an interlock with weather strip 76.

Note the three flanges 84 that depend from overcover 80 which fit into a center groove of the strip and at either side. With the weather strip securely adhered to the tailgate 78 and with the panel 14 closed to cause interlocking of the flanges 84 and weather strip 76, the tailgate cannot be opened. The interlocking also prevents any leakage of water into the truck bed through the interfacing of the tailgate and rear panel.

Reference is now made to FIG. 8 wherein it will be noted that the weather strip 74 is adhered to the top edge of the front wall 64 of the truck bed. Water will not leak into the truck bed through the interfacing of the anchor strip 62 at the truck bed wall 64.

Referring now to FIG. 10, the side wall weather strip 72 (adhered to truck bed side walls 38) is configured with a pair of strip portions 72a and b that form therebetween a drain channel. The upper engaging face of strip portion 72a is slightly canted and because the strip is elastomeric, and because of the camming action of the locking bars (at 58), the cover panels are drawn down onto the strip portion and tightly sealed against water leakage.

Should any water get through this seal, the drain channel between portions 72a and 72b will direct the water along the edge of the side wall and discharge it at either end. The portion 72b has the further function of supporting depending edge portions 22 that extend over the side edge of the truck bed covers and over portion 72b but which terminates short of the weather strip portion 72a. (See FIG. 12) This edge portion support helps to eliminate rattle of the cover panels.

From the above it will be appreciated that the entire side edge of the cover is sealed against water leakage. There still exists, however, the interfacing as between the adjacent panel edges. With reference to FIG. 5, it will be noted that with the panels drawn down tightly by the locking rods engaging the locking lugs, and due to the channel-shaped configuration of the hinge portions 20, 22, this interfacing is essentially water-sealed. Any water that enters the channel-shaped configuration of the edge portions will be channeled to the sides of the cover and discharged.

OPERATION

The above pickup cover is adapted to fit a variety of truck bed sizes. First the length must be determined. Whereas the three panels are a standard size, the anchor strip 62 is provided in different lengths to accommodate varying truck bed lengths.

The standard width of the panels will fit a variety of pickup widths. Note from FIG. 10 that the pickup side wall 38 has a wide top edge relative to the weather strip 72. The same panel width will simply extend over more or less of the top edge to accommodate truck bed width differences by as much as several inches.

The weather strip 72 is adhered on the top edges of the side walls to match the panel width. The front strip 74 is applied to the front wall and the anchor strip 62 is securely fastened to the front wall as illustrated in FIG. 8. The weather strip 76 is adhered to the top edge of the tailgate. The locking lugs are carefully located on the side walls, using spacers 54 to ensure a close proximity of the lug 36 and guide brackets 34 as illustrated FIG. 9. With these lugs fixed properly in place, the modifications to the truck bed are essentially completed.

The three panels as explained are produced from the same mold and the same locking mechanism is applied to each. Nothing more is added to the front panel 10. The center panel 12 is fitted with a brace member 24 along its rear edge as illustrated in FIG. 5, and an overcover is fitted to the rear edge of the rear panel 14 as illustrated in FIG. 7.

The three panels are similar in size, each being about 24-¾ by 59 inches for the small size of pickup trucks and about 32-½ by 67 inches for the large size pickup trucks. The panels are injected molded high density polyethylene and are tough and somewhat flexible when produced with 0.200 inch thick walls and depending ribs and edge walls of approximately one inch. In either truck size the panels are easy to handle, weighing about 14 lbs. for the small panels and 20 lbs. for the larger panels. The pickup as modified can be readily used in a conventional manner, with some care that the weather strips and anchor strip is not roughly abused. However, it is contemplated that tough weather stripping materials will be used and strong adhesive to adhere them to the truck bed walls.

When security against rain or theft is a concern, the three panels are removed from storage and fitted to the truck box. The front panel is stood up in the position of FIG. 3 but positioned to one side thereof. The hinge portion 22 is aligned between the hinge portion 20 and brace member 24 of the anchor strip, as illustrated in dash lines of FIG. 8, and the panel is simply slid into place. One or the other of the center or rear panels are simply laid in the proper position and the locking mechanism engaged to lock that panel to the truck bed. The last panel is than slid into interlocking engagement with the hinge portion of the positioned panel, in a manner similar to that of the front panel. Both the front panel and this latter panel are then folded down onto the truck bed with the hinge portion 20 of the front panel 10 nesting in the hinge portion 22 of panel 12. The lock mechanism for each is then engaged by the turning of handles 46.

A key-lock mechanism 86 securely locks the panels to the truck bed (see FIGS. 1–3, and 9). The key-lock 86 is key operated to pivot the lug 88. It is in a locked position where lug 88 abuts the end 50 of lever 40 of the lock mechanism 46 to thereby prevent turning of toggle lever 40 and withdrawal of the rods from locking lugs 36 (solid line position of FIG. 9). It is in an unlocked position where lug 88 is pivoted out of engagement with the lever 40 to permit withdrawal of the rods by turning of handle 46. In the locked and key-locked positions, the interior of the truck bed is secure (noting, of course, that the tailgate was closed prior to placement of the cover panels).

When loading and unloading of the bed is desired, any one of several panel openings are possible. The rear panel 14 can be unlocked and opened independent of either of the other panels as can the front panel 10. The center panel 12 can be unlocked and opened when rear panel 12 is closed, but only after the front panel has been opened sufficiently to pivot the hinge portion 22 out from under the hinge portion 20 of the front panel. And of course, the multiple panel openings shown in FIGS. 2 and 3 are achievable as well.

Figure 4:
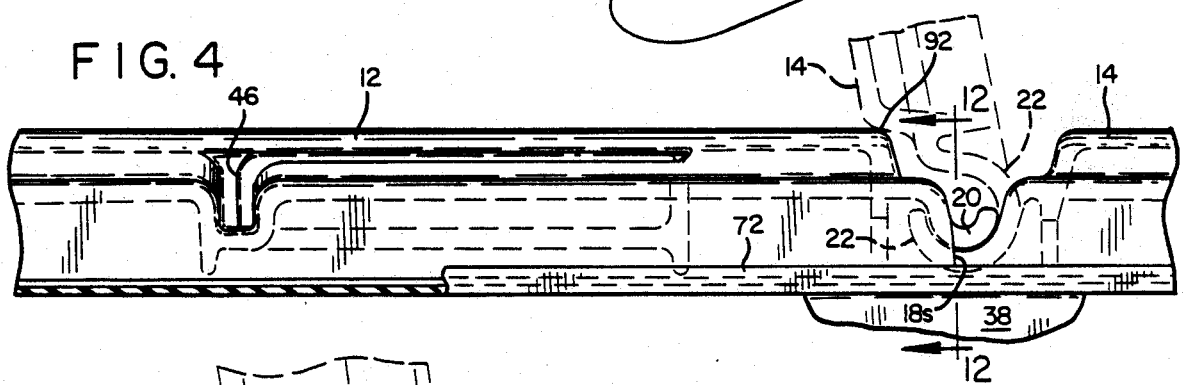
FIG. 4 is a partial view of the cover as taken on view lines 4—4 of FIG. 1.

Opening of a panel is accomplished in a one-handed operation. The fingers of one hand grip the handle and turn it 90 degrees to the position 46p and, using the handle as a lifting lever, the panel is simply raised or pivoted about its hinge connection to the stop generated by the interference between panels at position 92 (FIGS. 4 and 6). The panel is held in the open position due to the panel having crossed the vertical position where gravity action maintains the open position.

Whereas the panels and the interlocking of the panels is designed to withstand substantial abuse, it is recognized that an excessive force can be inadvertently applied when opening a panel. Opening the panels in a high wind, or driving off with a panel opened, are two situations when such excessive force may occur. The present panels are designed to provide a break-away hinge in such extreme conditions. Note from FIG. 6 that in the extreme opened position, a continued forcing of the open panel in the direction of arrow 90 will generate a leveraged force about the "stop" point 92. The force urges opening of the curved end 94 of brace member 24. By providing some springiness to the brace member, the panel will simply break away from its interlocked position. Providing some springiness to this brace member can be accomplished in a number of ways. Preferably the material selected for the brace member 24 is a suitable metal that has limited resilience when subjected to a substantial force and thus opens sufficiently to release the panel 14 under such conditions as described. A suitable material for the brace member 24 is e.g. 1/16 inch thick 12 gauge mild steel.

Numerous variations will become obvious to those skilled in the art without departing from the invention. The invention is not limited to the specific embodiment disclosed but is encompassed by the claims appended hereto.

We claim:

1. A cover on a pickup truck bed, said truck bed having side walls and a front end and a rear end, said cover comprising; a plurality of cover panels each having forward, rearward and side edges, a rear cover panel extending across the side walls for covering an area of the truck bed adjacent to the rear end of the truck bed, and a second cover panel for covering an area of the truck bed adjacent to and forward of said rear end area, said rear panel having a forwardly projected channel-shaped hinge portion along its forward edge and said second panel having a rearwardly projected channel-shaped hinge portion along its rearward edge, the rearwardly projected hinge portion of the second panel and the forwardly projected hinge portion of the rear panel interlocked to provide a hinged connection between the panels, and a lock mechanism for each panel to releasably and selectively lock said cover panels to the side walls of the truck bed, and said panels each being releasably free to pivot about the hinged connection whereby with either one of said cover panels locked in place over the truck bed, that panel functions as an anchored cover panel about which the other can be released and folded open to expose the underlying truck bed area.

2. A cover as defined in claim 1 wherein the cover panels extend over the side walls of the truck bed, and said inter-locking hinge connection includes means for disconnection of the panels in the folded open position by relative sliding of the panels axially of the hinge connection, and restricting means preventing relative sliding of the panels with the panels laid flat over the truck bed.

3. A cover as defined in claim 2 including key lock means for each panel to selectively key lock the cover panels to the truck bed.

4. A cover as defined in claim 2 wherein one of the channel-shaped hinge portions is nested in the other of said hinge portions, said interlocking hinge connection and cover panels configured to form a stop position with the one panel folded open, said stop position permitting opening of said panel past the vertical position, and a brace member is fixed to the panel of said one of the hinge portions and positioned under the other hinge portion for support thereof in an interlocked position.

5. A cover as defined in claim 4 wherein said brace member is resiliently bendable to provide break-away release of said interlocked hinge portions upon application of excessive pivotal force of said one panel about said stop position.

6. A cover as defined in claim 1 wherein said lock mechanism includes a toggle mechanism connected to two rods, said rods extended toward opposite side edges of the panel, and guide means for supporting the rods in said extended position, said toggle mechanism being pivoted in two directions, to shorten the extension of said rods when pivoted in one direction for unlocking and to lengthen the extension of said rods when pivoted in the other direction for locking.

7. A cover as defined in claim 1 including a front panel covering the truck bed area forward of the area covered by the second panel, the three panels being similarly sized and configured and each having similar forwardly projected channel-shaped hinge portions and rearwardly projected channel-shaped hinge portions, an anchor strip to be affixed to the front end of the truck bed and having a similar rearwardly projected channel-shaped hinge portion for hingedly interlocking relationship with the forwardly projected hinge portion of the front panel, and said rearwardly projected hinge portion of the front panel and the forwardly projected hinge portion of the second panel in overlapped relationship whereby the entire truck bed is covered by the panels and accessible by opening of selected ones of the panels.

8. On a truck bed including side walls, front wall and tailgate, a cover assembly comprising;
   weather strips applied to the top edges of the front wall, side walls and tailgate of the truck bed;
   three similarly sized and configured panels laid end-to-end to cover the truck bed with one of the panels being a rear panel, one a center panel, and one a front panel, said panels each reaching across the truck bed width to a position over the weather strips on the side walls and into sealing engagement therewith, and the rear panel extended over the weather strip on the closed tailgate and into sealing engagement therewith, each of said panels having a forwardly projected channel-shaped hinge portion and a rearwardly projected channel-shaped hinge portion, said hinge portions of adjacent panels adapted to nest together in overlapping relationship;
   an anchor strip attached to the front wall and in sealing engagement with the weather strip thereon and having a rearwardly projected channel-shaped hinge portion in interlocking hinge connection with the forwardly projected hinge portion of said front panel to permit opening and closing of said front panel about said hinge connection;
   the rearwardly projected hinge portion of said center panel and the forwardly projected hinge portion of said rear panel in interlocking hinge connection to permit relative pivoting for opening of either of the panels with the other of the panels closed; and the rearwardly projected hinge portion of said front panel and the forwardly projected hinge portion of said center panel in overlapping relation only, and permitting thereby pivoting of the panels about their opposite hinge connections.

9. A cover assembly as defined in claim 8 wherein the interlocking hinge connections include means for relative sliding of the panels along the pivotal axis of the hinge connection for disassembling thereof.

10. A cover assembly as defined in claim 9 including a lock mechanism for each panel including locking rods that are movably projected out of the panel sides, and rod receiving locking lugs affixed to the inner side walls of the truck bed and specifically positioned thereon to receive the locking rods of the panels with the panels closed and positioned respectively over designated truck bed areas.

11. A cover assembly as defined in claim 10 including a first brace member affixed to one of the anchor strip and first panel and extended into supporting engagement with the hinge portion of the other of the anchor strip and front panel, and a second brace member affixed to one of the center panel and rear panel and extended into supporting engagement with the hinge portion of the other of the central panel and rear panel, said brace members establishing the interlocking hinge connection as between the hinge portions in difference to the free overlapping hinge portions as between the front and center panels.

12. A cover assembly as defined in claim 11 including a toggle mechanism connected to said locking rods for extending and retracting said locking rods to lock and unlock the cover panels from the truck bed side walls, and a handle connected to the toggle mechanism and extended through said panel to be engaged by an operator for locking and unlocking the panels.

13. A cover assembly as defined in claim 12 including a key lock connected to one of said handle and toggle mechanism to key lock the toggle mechanism and locking rods actuated thereby in a locked position.

14. A cover asembly as defined in claim 13 including restricting means provided on said panels to restrict relative sliding of the panels with the panels in the closed position.

15. A cover assembly as defined in claim 11 wherein the brace member is resilient and deformable upon application of excessive opening force applied to the panels for break away release of the interlocked panels.

16. A cover assembly as defined in claim 10 wherein the locking rods have a locking-lug-insertable end portion that is beveled, and said locking lug has a mated beveled entry for receiving said insertable end portion, said beveled portions, upon locking action, inducing drawing of the panel down onto the truck bed side walls into tight sealing and rattle inhibiting relation.

17. A cover assembly as defined in claim 8 including an overcover fixedly attached to the rearwardly extended hinge portion of the rear panel, flanges depending from the overcover and into engagement with the weather strip on the tailgate, said flanges and said weather strip mated to interlock with the tailgate and rear panel when closed to prevent opening of the tailgate without first opening the rear panel.

18. A cover assembly as defined in claim 8 wherein the anchor strip is provided in varying lengths to accommodate different lengths of truck beds.

19. A cover assembly as defined in claim 8 wherein the overlapping channel-shaped portions are sealingly overlapped and cooperatively produce a water drain to channel and discharge water over the sides of the truck bed.

20. A cover assembly as defined in claim 14 wherein the restricting means is a side edge overlap of the panel that depends over the interlocked hinge portions with the panels closed and prevent thereby relative sliding, and which pivots away from said interlocked hinge portions with the panel open, and said hinge portions having beveled side edges that effects a camming action for aligning the panels when slightly misaligned in the open position, said camming action forcing alignment upon closing of the panels.

21. A cover for a pickup truck bed having side walls and a front and rear end, said cover comprising; a pair of cover panels, said cover panels extending across the side walls for covering an area of the truck bed, hinge means hingedly connecting adjacent end edges of said panels, locking means for locking each of said panels to the truck bed in the connected position, each of said adjacent end edges including a channel-shaped hinge portion and said hinge portions being nested together for relative pivoting about an axis along the end edges, said panels being relatively slidable along said pivoting axis with one of said panels folded open, and restricting means restricting relative sliding of the panels with the panels laid flat over the truck bed.

* * * * *